United States Patent [19]

Strong

[11] 4,012,808

[45] Mar. 22, 1977

[54] CONTINUOUS METHOD AND APPARATUS FOR MARINATING POULTRY

[75] Inventor: William K. Strong, Solvang, Calif.

[73] Assignee: Restaurant Technology, Inc., Oak Brook, Ill.

[22] Filed: Oct. 15, 1974

[21] Appl. No.: 514,669

[52] U.S. Cl. .................................. 17/1 R; 17/11; 17/51; 426/644

[51] Int. Cl.² ........................................ A22C 21/00

[58] Field of Search .................. 17/11, 1 R, 51, 45, 17/74, 24, 25; 99/516, 534, 535; 426/644, 302, 281, 652

[56] References Cited

UNITED STATES PATENTS

| | | | |
|---|---|---|---|
| 2,047,688 | 7/1936 | Jenkins | 17/74 |
| 2,608,716 | 9/1952 | Harris | 17/51 |
| 2,779,052 | 1/1957 | Zebarth | 17/11 |
| 2,927,341 | 3/1960 | Zebarth | 17/11 |
| 3,037,237 | 6/1962 | Lapeyre et al. | 17/74 |
| 3,049,986 | 8/1962 | Weber | 99/534 |
| 3,149,554 | 9/1964 | Greenspan | 99/534 |
| 3,238,560 | 3/1966 | Jurisch | 17/51 |
| 3,282,195 | 11/1966 | Young et al. | 99/534 |
| 3,719,504 | 3/1973 | Greenspan et al. | 17/25 |
| 3,928,634 | 12/1975 | Gasbarro | 426/644 X |

Primary Examiner—Louis G. Mancene
Assistant Examiner—James D. Hamilton
Attorney, Agent, or Firm—Dressler, Goldsmith, Clement, Gordon & Shore, Ltd.

[57] ABSTRACT

A continuous method for enhancing the pick-up of marinade by poultry, such as chicken. Cut chicken pieces are introduced into a continuous conveyor assembly in which marinade liquid is maintained at a predetermined level. The chicken pieces are conveyed longitudinally of the conveyor and are repeatedly lifted up out of the marinade and are dropped back into the marinade, optimally between 40 and 90 times. A continuous marinating apparatus is disclosed having an elongate screw conveyor for carrying chicken pieces longitudinally of a vessel in which the conveyor is positioned. The screw conveyor has a plurality of vanes between adjacent pairs of screw conveyor flights for lifting the chicken pieces and for allowing the chicken pieces to drop back into the liquid in the trough. Discharge vanes at the end of the screw conveyor scoop up the chicken pieces and convey them upwardly to a discharge station for discharge outwardly of the trough.

7 Claims, 4 Drawing Figures

U.S. Patent  Mar. 22, 1977  4,012,808
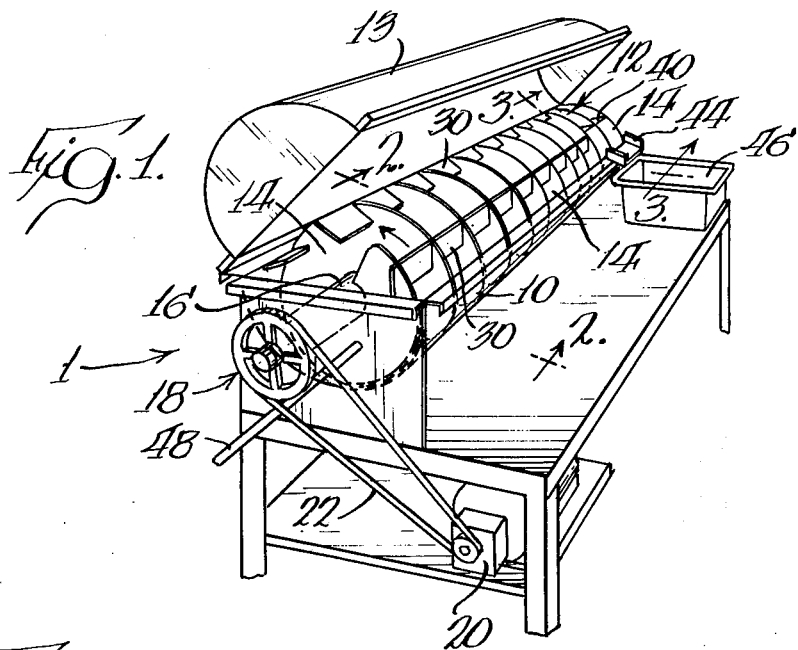
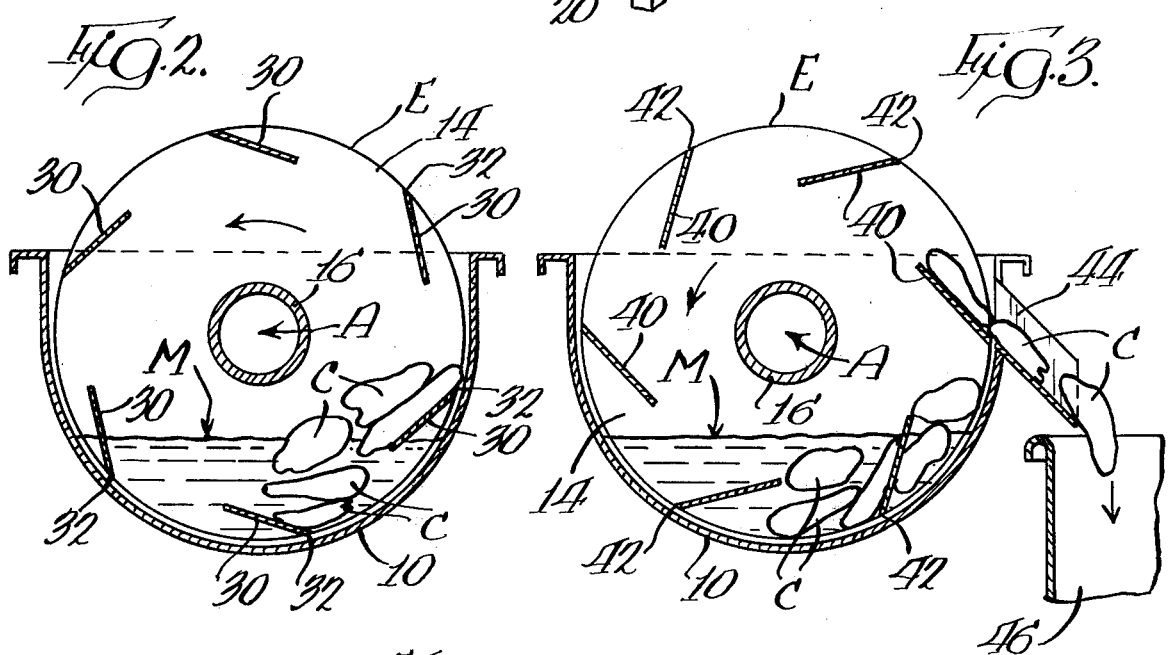
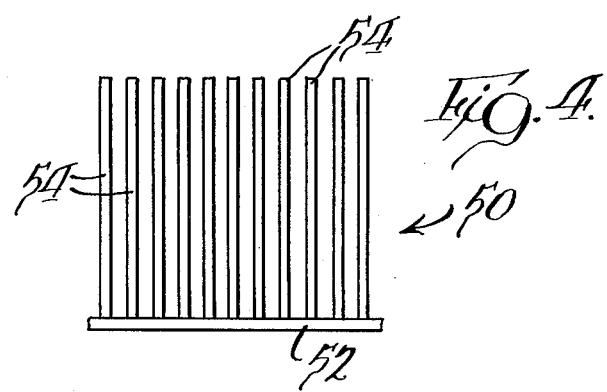

CONTINUOUS METHOD AND APPARATUS FOR MARINATING POULTRY

This invention relates to an improved method and to improved apparatus for marinating poultry and for enhancing the pick-up of marinade by poultry, such as chicken.

It has been determined that the flavor and texture of chicken, particularly of pieces of chiken to be fried, are enhanced when the chicken pieces are treated with a marinade and when they pick up and retain the marinade. Flavor enhancement results from the pick up of salts and other additives which may be used in the marinade. Further, absorbed moisture tends to result in a more moist texture in the finished cooked product after frying.

Various methods have been employed to cause chicken pieces to pick up and retain marinade. In one such process, chicken pieces have been immersed in, and carried through a marinade for a period of time sufficient to allow the chicken pieces to soak up some marinade. The amount of pick up is not constant in this process, and less than the desired amount of pick up frequently results from the use of a such a process. Further, the time of immersion is lengthy and is frequently a bottleneck in continuous chicken processing.

In yet another method of marinating chicken pieces, a drum is packed with chicken pieces and with some marinade, and the contents of the drum are tumbled. Some marinade is picked up in such a process, but here again it is a batch process which requires excessive handling and which does not lend itself to continuous chicken processing. Further, the chicken often gives up some of the marinade picked up in batch processes before it can be breaded and frozen or otherwise suitably processed.

I have discovered a method by which chicken pieces can be made to pick up greater volumes of marinade than is usually possible in similar time periods with existing processes. I have determined that this may be done on a truly continuous basis so that the marinating step in the processing of chickens may be performed in-line with the other treatment steps, without being a bottleneck in a chicken processing line and while retaining more of the marinade, with less handling, than is usually possible with batch processes.

In accordance with my process, cut chicken pieces are introduced into a continuous conveyor assembly in which marinating liquid or marinade is maintained at a predetermined level. The marinade is continuously replenished as it is taken up by the chicken pieces and the percentages of salts and other ingredients of the marinade are monitored for supplementing as the marinade is absorbed by the chicken pieces. The pieces are conveyed in a generally horizontal direction longitudinally of the conveyor. As the chicken pieces are conveyed longitudinally, they are also repeatedly lifted out of the liquid marinade, and are dropped back into the marinade.

The lifting and the repeated dropping and tumbling of the chicken pieces back into the marinade solution appears dramatically to increase thhe rapidity of pick-up of marinade as compared simply to carrying the chicken pieces through a marinade bath for the same time period. Although I am not certain, this may well be attributable to the increased working and flexing of the chicken flesh and tissue making the flesh and tissue more receptive to the pick-up of marinade than it would otherwise be. In any event, the repeated lifting and dropping of the chicken pieces from and back into the liquid marinade causes the chicken pieces to pick up and absorb marinade rapidly, thereby making it possible to marinate in-line in a chicken processing line and, when performed in a continuous conveyor, making it possible to operate a chicken processing line on a truly continuous basis, eliminating marinating as a bottleneck to continuous chicken processing.

Marinating apparatus in accordance with my invention comprises an elongate vessel for containing marinade and proportioned to accommodate a conveyor for carrying chicken pieces from one end of the elongate vessel to the other. The conveyor is proportioned to carry the chicken pieces longitudinally through the vessel and also repeatedly to lift the chicken above the level of the marinade and then, as frequently, to allow the chicken to drop back down into the marinade.

In one form, the vessel comprises an elongate trough in which a screw conveyor is mounted for rotation relative to the trough. Chicken pieces are introduced to the screw conveyor at one end and the flights of the screw conveyor carry the chicken to the other end. Liquid is maintained in the trough at a level below the center of the screw conveyor shaft. The screw conveyor is provided with lifting means such as lifting vanes which are mounted between the flights. The lifting vanes are angled rearwardly so that they do not tend to bite or cut into the chicken pieces. Rather, the lifting vanes tend gently to scoop up the chicken pieces. After they have lifted the chicken pieces, because of their rearward inclination, the lifting vanes allow the chicken pieces to slide rearwardly, and therefore to tumble and slide and drop downwardly into the marinade. At that time, the next lifting vanes again begin to lift the chicken. As such, where the screw conveyor has a plurality of such flights, the chicken pieces are repeatedly lifted and dropped as they move longitudinally of the screw conveyor.

At the end of the screw conveyor, oppositely directed discharge vanes may be used to scoop up chicken pieces and to convey those upwardly to a discharge station at which the pieces slide downwardly and outwardly of the trough into a container or conveyor ready for their introduction into the next chicken processing stage.

In this manner, chicken pieces are continuously marinated effectively and rapidly. By providing a truly continuous process, the chicken pieces are more quickly ready for subsequent treatment and freezing, resulting in chicken which retains a greater amount of marinade with its attendant advantages.

Further objects, features and advantages of this invention will become apparent from the following description and drawings, of which FIG. 1 is a perspective view of a conveyor assembly of this invention;

FIG. 2 is a cross-sectional view taken substantially along the line 2—2 of FIG. 1;

FIG. 3 is a cross-sectional view taken substantially along the line 3—3 of FIG. 1; and FIG. 4 is a front view of a further embodiment of a lifting vane of this invention.

Referring first to the drawings, a chicken marinating assembly 1 made in accordance with this invention is seen to include a trough 10 for containing liquid marinade M and a screw conveyor 12. The trough 12 is generally semicylindrical with generally vertical upper longitudinal edges. The ends are generally flat. A cover 13 for sanitary purposes may be used. Screw conveyor 12 mounts a plurality of flights 14.

Flights 14 form a usual spiral configuration. They are centrally secured, as by welding, to a central axle or hub 16 which is suitably journaled for rotation, as on the trough 10. The journaling means may be conventional. Suitable driving means 18, such as a variable speed motor 20 and a drive belt 22 are mounted to provide power to rotate hub 16, thereby to cause the screw conveyor 12 to rotate. As the screw conveyor 12 rotates it tends to carry the chicken pieces C generally longitudinally from one end of the conveyor to the other.

Lifting means are also provided for lifting the chicken pieces C out of the marinade. As best seen in FIG. 2, the lifting means there shown comprises a plurality of lifting vanes 30. Lifting vanes 30 are each positioned between an adjacent pair of flights 14. Preferably they extend inwardly from the outer or peripheral edges E of the flights where, because they and the flight peripheries E are closely adjacent to the confronting surfaces of the trough (see FIG. 2), neither the flights nor the lifting vanes are likely to cut into the chicken pieces C as the screw conveyor 12 rotates. In the embodiment illustrated, the vanes are equidistantly spaced about the periphery of the flights. There is at least one, desirably at least three and, depending upon the size and dimensions of the conveyor and the speed at which it is to be run, as many as six or more vanes between each of the adjacent pairs of flights.

As viewed in FIG. 2, screw conveyor 12 rotates in a counterclockwise direction. In that case the lifting vanes 30 incline rearwardly from their outer edges 32 adjacent the wall of trough 10 with respect to a plane including the edges 32 and the central axis A of hub 16. Stated another way, the lifting vanes incline rearwardly of the direction of rotation of the screw conveyor 12, desirably at an angle of from about 45° to about 60°. As such, as seen in FIG. 2, the lifting vanes 30 will tend to scoop up chicken pieces C as the vanes approach the very bottom of trough 10 and will tend to lift pieces C up as the vanes approach the very bottom of trough 10 and will tend to lift pieces C up as the vanes move upwardly. However, as the lifting vanes continue to move upwardly, the chicken pieces C will slide rearwardly and downwardly along the vanes 30 and will then drop off the vanes and downwardly into the marinade solution in the trough. As the screw conveyor 2 continues to rotate, the chicken pieces C will be lifted and dropped back into the marinade over and over again.

When the chicken pieces C reach the far end of the chicken marinating assembly 1, it is necessary to remove them from the trough 10. To that end, at the end of the lifting vane section, means are provided for effecting the removal of the chicken pieces C from the marinating assembly. In the embodiment illustrated, the last two pairs of flights mount a different plurality of vanes, namely discharge vanes 40. Vanes 40 are secured between flights 14 in the same manner as are vanes 30. Desirably three and preferably as many as six or more equidistantly spaced discharge vanes are provided between at least one of the pairs of adjacent flights. However, discharge vanes 40 incline in the opposite direction, desirably at an angle of about 45° to about 65° forwardly of a plane including their outer edges 42 adjacent the trough and the axis A of hub 16. As such, discharge vanes 40 tend to scoop up the chicken pieces C (see FIG. 3) and to carry them upwardly as the screw conveyor rotates until the chicken pieces are carried out of the marinade to an elevation at which they will freely slide and tumble downwardly. At that elevation, a discharge chute 44 is provided to receive the chicken pieces C to convey them to a suitable conveyor 46 for the next processing step. In the embodiment illustrated, conveyor 46 is shown as a container. It may be appreciated, however, that conveyor 46 could be a continuous conveyor instead.

Lifting vanes 30 are mounted with and secured to flights 14. In the embodiment illustrated vanes 30 are elongate and flat and several are continuous, extending across several pairs of adjacent flights. To assemble the vanes to the flights, the flights are first suitably slotted to accommodate the thickness of the vanes. The vanes 30 are then forced into the slots across three, four or more flights. To maintain their securement, the vanes may be welded or brazed to the flights. Similarly, the flights mounting the discharge vanes are first slotted, and then vanes 40 are fixed in the slots. Of course, other modes of securing vanes may be employed such as simply welding or brazing vane plates at their side edges to the flights.

The vanes may be solid plates. If perforated, they would tend to abrade the chicken pieces and would tend to collect pieces of chicken resulting in equipment which is difficult to maintain appropriately sanitary. Further, the inner edges of the vanes are spaced away from the hub 16 to allow chicken freely to tumble in the marinade.

The lifting vanes may also be of other shapes and configurations. For example, the vanes, as illustrated by FIG. 4, may be a comb-like member 50 comprising a rod 52 approximately one-half inch diameter and a plurality of rod-like inwardly extending fingers 54 three-eights inch in diameter connected at right angles thereto, and spaced apart approximately one-half inch. Fingers 54 extend inwardly and rearwardly from the peripheral edges of the flights. Such a member 50 may be welded at its ends between and to adjacent pairs of flights in lieu of vane plates, and may be angled and positioned just as the vane plates are. Comb-like members 50 tend to promote release and sliding of the chicken pieces.

A marinator assembly generally in accordance with FIGS. 1 to 3 has been constructed and has been used in connection with the processing of chicken pieces. That marinator assembly utilized a screw conveyor having a 14 inch diameter. The conveyor was about 72 inches long and the flights were spaced 6 inches apart. Six lifting vanes were provided between each adjacent pair of flights. The lifting vanes were each angled rearwardly of a plane including their outer edges and the hub axis at about 60°. The six discharge vanes between each of the last two pairs of flights were angled forwardly of a plane including their outer edges of the hub axis at about 45°. The lifting vanes and discharge vanes each extended inwardly of the periphery about 2 inches. The clearance between the screw conveyor and the semi-cylindrical trough bottom was kept as close to about ¼ inch as was possible.

Chicken has been processed in the marinator assembly which has been described. First, chicken was cut up into nine pieces, namely into two drumsticks, two thighs, two wings, two side breasts and one keelbone.

These pieces were cut from chickens weighing slightly in excess of two pounds each. In some cases, the chickens had been killed as much as a week earlier and had been kept packed in ice. In other cases, the chickens had been freshly killed and were up to approximately one day old.

For test purposes, one batch of five chickens approximately one day old (post killing) was cut into nine pieces each and was introduced into the marinator assembly just described. The liquid marinade in the assembly was maintained at a level of approximately 5 inches above the very bottom of the trough and the chicken pieces were conveyed through the liquid marinade longitudinally from one end of the conveyor to the other end. The marinade solution was a ten percent solution of sodium chloride. The level and salt content were monitored and were supplemented as necessary during the processing, as through a suitable supply line 48. The chicken pieces were repeatedly lifted by the lifting vanes and were carried up out of the liquid marinade and dropped back into the liquid marinade as the chicken pieces were conveyed longitudinally from one end of the conveyor to the other in a single run. The total processing time was about 15 minutes. At the discharge end of the conveyor, the chicken pieces were scooped up by the discharge vanes and were discharged into a conveyor as described above. The weight percent pick-up of marinade was found to be approximately 3.8% in the chicken pieces.

Another batch of five chickens about one day old (post killing) was cut up as described and was similarly processed for fifteen minutes. However, the liquid level in the trough was maintained at about 3½ inches in depth, the level of the marinade M illustrated in FIGS. 2 and 3. In that case, the total percent pick-up of marinade by weight was found to be approximately 6.1%. This was substantially in excess of the 3.8% for chickens carried through the conveyor in a marinade maintained at a depth of about 5 inches.

Although the pick-up of marinade when the depth in the trough was at 5 inches was greater than would have been obtained by simply immersing the chicken within a marinade for fifteen minutes, this pair of tests demonstrated that the more the number of times the chicken pieces were lifted up and out of the marinade and tumbled back down into the marinade, the greater the pick-up of marinade by the chicken pieces. When the chicken tended to float more and to remain partially or totally submerged, as it did with the greater depth of marinade, there was less agitation of the chicken pieces and less flexing of the chicken flesh and tissue, hence less pick-up of marinade.

The length of time after chickens have been killed is a substantial factor in the amount of marinade they will pick up in a marinade processing step. Generally speaking, immediately after chickens are killed and dressed, they are chilled in ice water. During that time they absorb an average of about 10% water. If they are held in ice for up to a week or so, they tend to lose a considerable amount of the absorbed water as drip out. In other words, the longer the chickens are held in ice, the more their moisture loss and the greater the chicken's ability to reabsorb moisture during a subsequent marination process. Accordingly, chickens which are freshly killed and promptly marinated will tend to pick up much less marinade than will older chickens.

Other tests were run in the marinating apparatus just described in which five chickens cut into nine pieces each were marinated. The chickens were 6 to 7 days old having been packed in ice. In one test, the liquid level was maintained at about 3½ inches and the chicken pieces were carried through the marinator in about 6¾ minutes. The marinade solution was maintained at about 5½salt. The total pick-up of marinade was about 9%. In yet another test, the chicken pieces were carried through in two passes of ten minutes and three minutes, respectively, and the total pickup was about 14%. In three other tests, six chickens were carried through in two passes of three minutes each and the total pick-up was about 12, 12.6 and 14.7%, respectively, by weight.

The tests indicate to me that the working of the chicken flesh by repeated forced tumbling by the vanes and liftings and droppings by the lifting vanes greatly enhances marinade pick-up as compared to pick-up resulting from the practice of non-agitating prior art processes. It appears to me that optimum processing in accordance with this invention utilizes approximately 40 to 90 liftings out of, and droppings back into the marinade. Although more or less may be used, and more or less may be necessary depending upon the amount of chicken pieces being processed at the same time, the age of the chicken, etc., approximately 40 to 90 liftings should give optimum pick-up results within the framework of the amount of marinade it is desirable to pick up and within the framework of other of the limitations and restrictions imposed by a continuous chicken processing line on a marinating step.

Chicken marinated in accordance with the process of this invention has been subsequently battered, breaded and frozen, all in accordance with conventional procedures. Thereafter the chicken pieces have been conventionally deep-fat fried. The finished fried chicken shows the results of the moisture pick-up from marination in that the pieces are quite moist and tender and more so than is the unmarinated products. Further, the chicken meat has a better flavor as a result of the salt which is absorbed during the course of the marinating process. Of course, it is also possible to precook the chicken after marinating, battering and breading and before freezing.

Although a screw conveyor has been described as the preferred embodiment for the practice of the method of this invention, it will be apparent that there are other possible ways of inducing lifting and dropping of the chicken in a marinade solution. For example, conveyors which rise out of marinade solution to carry chicken upwardly and then allow it to drop back into the solution, again to be lifted up by another conveyor or conveyor section, then to be dropped again, may also be used.

Although only a presently preferred embodiment of the apparatus of this invention and a particular mode of carrying out the method of this invention have been described and illustrated, it will be clear to those skilled in the art from the foregoing specification and drawings that modifications may be made without departing from the spirit and scope of the invention. Accordingly, the invention disclosed herein is intended to be limited only as may be required by the claims.

I claim:

1. A continuous marinator assembly comprising an elongate trough and a continuous screw conveyor in said trough, said screw conveyor having a central hub and a plurality of flights spirally secured to said hub, a plurality of lifting vanes and at least one lifting vane positioned between each adjacent pair of flights and extending inwardly and rearwardly with respect to the direction of rotation of said screw conveyor from the peripheral edges of said flights to lift and to drop poultry pieces disposed between said flights, discharge vanes at one end of said screw conveyor for lifting poultry pieces upwardly, said discharge vanes extending inwardly from the periphery of at least one pair of adjacent flights and inclining forwardly in a direction opposite from the direction at which the lifting vanes are inclined, a discharge chute at one end of said trough adjacent the end of the screw conveyor mounting the discharge vanes for receiving poultry lifted by the discharge vanes, and in which said lifting vanes extend rearwardly at an angle of from about 45 to about 60 degrees from a plane including the outer edges of the vanes and the axis of said hub, the peripheral edges of said flights and said lifting vanes being positioned closely adjacent said trough whereby neither the flights nor said lifting vanes are likely to cut into poultry pieces disposed in said marinator assembly.

2. A marinator assembly of claim 1 in which said lifting vanes are at least three in number between each pair of flights and are equidistantly spaced about the periphery of the flights.

3. A marinator assembly of claim 1 in which said discharge vanes extend forwardly at an angle of from about 45° to about 65° from a plane including the outer edges of the discharge vanes and the axis of said hub.

4. A marinator assembly of claim 1 in which said flights are slotted, and in which said lifting vanes are flat plates seated and retained in the flight slots.

5. A marinator assembly of claim 1 in which said lifting vanes comprise comb-like members having their fingers extending inwardly and rearwardly from the peripheral edges of said flights.

6. A marinator assembly of claim 2 in which said lifting vanes comprise comb-like members having their fingers extending inwardly and rearwardly from the peripheral edges of said flights.

7. A continuous method of marinating poultry pieces, comprising cutting poultry into poultry pieces, introducing said poultry pieces into an elongate continuous conveyor assembly, maintaining liquid marinade in said conveyor assembly and continuously replenishing the liquid marinade to maintain a predetermined liquid level and concentration of marinade, conveying said poultry pieces through said liquid marinade longitudinally from one end of said conveyor assembly to the discharge end of said conveyor assembly, repeatedly lifting said poultry pieces up and out of said liquid marinade and dropping said poultry pieces back down into said liquid marinade from forty to ninety times as said poultry pieces are conveyed from one end of said conveyor to the other, thereby to work and agitate said poultry pieces to enhance the absorption of marinade by said poultry pieces, and in which said conveyor assembly comprises a screw conveyor in a trough for containing said marinade, and said screw conveyor defines a plurality of flights for conveying said chicken pieces longitudinally through said marinade, annd in which said screw conveyor mounts rearwardly inclined lifting vanes for lifting said poultry pieces out of said marinade and for dropping said poultry pieces back down into said marinade, at least one of said vanes being disposed between each adjacent pair of flights, whereby said poultry pieces are conveyed between said adjacent pairs of flights from one end of said conveyor to the other, then, at the discharge end, automatically lifting said poultry pieces up and out of the marinade with discharge vanes and automatically discharging said poultry pieces outwardly of the conveyor assembly and trough.

* * * * *

UNITED STATES PATENT AND TRADEMARK OFFICE
CERTIFICATE OF CORRECTION

PATENT NO. : 4,012,808
DATED : March 22, 1977
INVENTOR(S) : William K. Strong

It is certified that error appears in the above-identified patent and that said Letters Patent are hereby corrected as shown below:

Col. 1, line 10, "chiken" should be -- chicken --;

line 25, after "of" delete "a";

line 63, "thhe" should be -- the --;

Col. 6, line 6, after "5-1/2" insert -- % --;

Claim 7, Col. 8, line 25, "annd" should be -- and --

Signed and Sealed this

Twenty-fourth Day of May 1977

[SEAL]

*Attest:*

RUTH C. MASON
*Attesting Officer*

C. MARSHALL DANN
*Commissioner of Patents and Trademarks*